UNITED STATES PATENT OFFICE.

WILHELM DIETERLE, OF FEUERBACH, NEAR STUTTGART, GERMANY, ASSIGNOR TO I. HAUFF, OF SAME PLACE.

PROCESS OF REMOVING LIME FROM HIDES.

SPECIFICATION forming part of Letters Patent No. 450,930, dated April 21, 1891.

Application filed August 31, 1889. Serial No. 322,612. (No specimens.)

*To all whom it may concern:*

Be it known that I, WILHELM DIETERLE, a subject of the King of Würtemberg, Germany, residing in the village of Feuerbach, near Stuttgart, Würtemberg, Germany, have invented certain new and useful Improvements in Processes of Removing Lime from Hides, of which the following is a specification.

In treating hides with cresotinic acid for the purpose of neutralizing the lime in the same it was found that said acid exerted a too active influence, under certain circumstances, on the tender skins—such as calf and goat skins—used for glove-leather. By a series of experiments made with the oxynaphthoic acids, which acids are soluble in the proportion of one part of acid in from ten thousand to thirty thousand parts of water, it was found that by these acids even the most tender skins can be successfully freed from lime, and that even coarser skins can be successfully treated by subjecting them for a correspondingly longer time to the action of said acids.

By oxynaphthoic acids are understood the carbo-acids which are obtained by treating the alkali compounds of alpha and beta naphthol with carbonic acid. Other modes of producing said carbo-acids may also be used. It was further found that in such cases in which no swelling effect was intended to be produced—as, for instance, in heavy skins—mixtures of oxynaphthoic acid with cresotinic acid and salicylic acid may be successfully used for removing the lime. The most interesting result, however, which was discovered in the application of oxynaphthoic acid or a mixture of oxynaphthoic and cresotinic acids in removing lime from hides was that much less of said acids is required than would be proportionately necessary for utilizing the lime. This fact may be explained by the property of the oxynaphthoic and cresotinic acids of forming soluble basic lime compounds. By actual tests in a tanning establishment it was found that the lime was neutralized by one-eighth part of the quantity of oxynaphthoic acid ordinarily required for producing the required result. It was further found that in one hundred kilos of lime-swelled hides are contained about one thousand grams of CaO. After the treatment of the hides these one hundred kilos contain only five hundred and forty grams of CaO. The dissolved four hundred and sixty grams of CaO would have required two thousand four hundred and ninety-eight grams of oxynaphthoic acid for forming the neutral salt; but as in practice only three hundred grams of acid were used, only one-eighth part of the quantity theoretically required for the formation of the neutral salt produced the desired result. The hides had attained that degree of settling which the tanner deemed necessary, and the leather produced thereby had all the properties required. Additional experiments made with neutral combinations of lime with oxynaphthoic acid and cresotinic acid (besides other neutral salts of these acids) have produced similar results.

By the foregoing it is obvious that the high price of the oxynaphthoic acids forms no obstacle to their successful application, as the small quantities of the same which have to be added to the tanning-liquor render the latter still cheaper than the liquors heretofore employed, while the very important antiseptic properties of these carbo-acids form an additional advantage.

In practically carrying out my improved process of removing lime from hides oxynaphthoic acid or a mixture of the same with cresotinic acid or with cresotinic and salicylic acids is dissolved in water and added in sufficient quantity to the tanning-liquor in proportion to the number of hides to be treated in the vats. This proportion is computed by using the before-mentioned experimental proportions as a basis for the computation. The lime-swelled hides are then placed into the tanning-vats in the well-known manner and subjected to the action of the tanning solution, the result being as above stated. From time to time an additional quantity of the acid has to be supplied to the tanning-liquor, so as to restore the action of the same upon the hides.

I do not claim in this application the use of cresotinic acid in removing lime from hides, as this is covered by the patent heretofore granted to me, No. 413,615, dated October 22, 1889.

Having thus described my invention, I claim as new and desire to secure by Letters Patent—

1. The process herein described of neutralizing the lime contained in hides, which consists in treating the same with an aqueous solution of oxynaphthoic acid, substantially as set forth.

2. The process herein described of neutralizing the lime contained in hides, which consists in treating the same with an aqueous solution of oxynaphthoic acid and cresotinic acid, substantially as set forth.

3. The process herein described of neutralizing the lime contained in hides, which consists in treating the same with an aqueous solution of oxynaphthoic acid, cresotinic acid, and salicylic acid, substantially as set forth.

In testimony whereof I have signed my name to this specification in the presence of two subscribing witnesses.

WILHELM DIETERLE.

Witnesses:
    FRITZ HAUFF,
    ERNST WICHRICH.